June 16, 1931.   J. R. KINNEY   1,809,976

CLUTCH

Original Filed April 12, 1928

Inventor:
Justus R. Kinney,
by Walter E. Lombard,
Atty.

Patented June 16, 1931

1,809,976

UNITED STATES PATENT OFFICE

JUSTUS R. KINNEY, OF JAMAICA PLAIN, MASSACHUSETTS

CLUTCH

Application filed April 12, 1928, Serial No. 269,422. Renewed October 2, 1930.

This invention relates to clutches and has for its object the production of a simple but effective double acting clutch including a slidable sleeve and two revoluble members adapted to be driven by a rotatable driving member, said driving member being brought into frictional contact with one revoluble member and disengaged from the other revoluble member by an endwise movement of said slidable member in one direction while the endwise movement of the slidable member in the opposite direction will bring said driving member into frictional contact with the other revoluble member and disengage it from the first mentioned revoluble member.

This object is attained by the mechanism illustrated in the accompanying drawings.

For the purpose of illustrating the invention, one preferred form thereof is illustrated in the drawings, this form having been found to give satisfactory and reliable results, although it is to be understood that the various instrumentalities of which the invention consists can be variously arranged and organized, and the invention is not limited to the precise arrangement and organization of these instrumentalities as herein shown and described except as required by the scope of the appended claims.

Of the drawings.

Similar characters indicate like parts throughout the several figures of the drawings.

Figure 1:
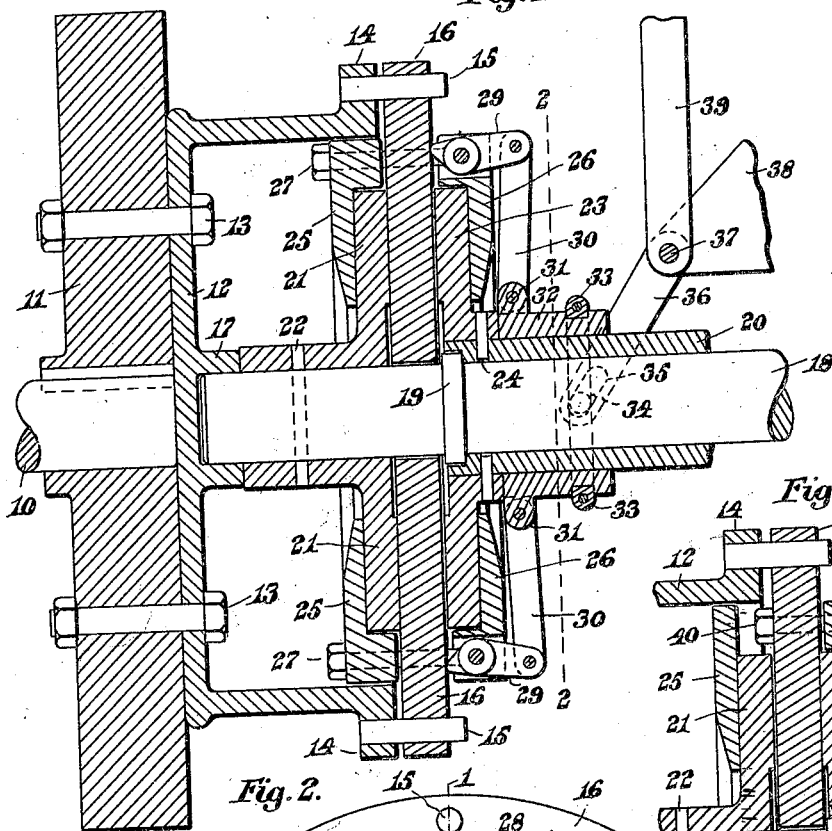
Figure 1 represents a vertical section of a clutch embodying the principles of the present invention, the cutting plane being on line 1, 1, on Fig. 2.

In the drawings, 10 is a rotatable driving shaft having keyed thereto a fly wheel 11 or similar member, and to this fly wheel member a cup-shaped housing 12 is secured by bolts 13.

The cup-shaped housing 12 has a peripheral flange 14 from which extends a plurality of parallel pins 15.

These pins 15 may be secured to the flange 14 in any well known manner and the disk 16 is adapted to reciprocate endwise of these pins.

The cup-shaped housing 12 has an annular flange 17 at the inner end thereof forming a bearing for the end of a shaft 18 adapted to be driven by the driving shaft 10 under certain conditions.

This shaft 18 has a collar 19 thereon against which one end of a hollow shaft 20 abuts, this hollow shaft being adapted to revolve upon the periphery of the inner shaft 18.

Mounted on the shaft 18 is a flange member 21 secured to said shaft by means of a pin 22 so that the shaft 18 and the flange member 21 must revolve together.

The flange member 21 is adjacent one face of the disk 16 and on the opposite side of said disk is another flange member 23 secured to the hollow shaft 20 by means of pins 24.

Contacting with the outer face of the flange 21 is a ring 25 and contacting with the outer face of the flange 23 is a similar ring 26.

Through the ring 25 extend a plurality of studs 27 having heads at one end bearing against the outer face of the ring 25, while their opposite ends are provided with eyes 28.

Pivoted to these eyes 28 are a plurality of cam levers 29 each having a toe adapted to bear against one face of the disk 16.

The opposite ends of these cam levers 29 are connected by means of links 30 to ears 31 radiating from the periphery of a slidable sleeve 32, said sleeve surrounding the hollow shaft 20 and being slidable endwise thereon.

The sleeve 32 has a peripheral groove therein in which is mounted a ring 33 having trunnions 34 extending therefrom into slots 35 in a lever 36 secured to a fulcrum pin 37 mounted in a fixed member 38.

This fulcrum pin 37 has secured thereto an actuating lever 39 whereby the sleeve 32 may be moved endwise when it is desired to actuate the clutch mechanism.

The disk 16 has extending therethrough a plurality of studs 40 which also extend through the ring 26, these studs having heads at one end bearing against the face of the disk 16 while the opposite ends thereof are provided with eyes 41 to which are pivoted the cam levers 42 each having a toe adapted to bear against the outer face of the ring 26.

The outer ends of the levers 42 are connected by links 43 to ears 44 radiating from the periphery of sleeve 32.

When the sleeve 32 is in an intermediate position the disk 16 will be free from contact with each of the flange members 21 and 23.

When the sleeve 32 has been moved into the position indicated in Fig. 1 by means of the actuating lever 39, the toes of the cam members 29 will bear against the disk 16 and force it into frictional contact with the adjacent face of the flange 21.

It will be seen that when in this position the flange 21 is gripped by the ring 25 and the disk 16 so that all three members are compelled to rotate together.

When in this position the rotary movement of the shaft 10 will be transmitted to the shaft 18.

Simultaneously with the actuating of the cam levers 29 the cam levers 42 will be moved about their pivots so that the toes of said cam levers will move outwardly and permit the disk 16 to become disengaged from the flange 23.

Figure 3:
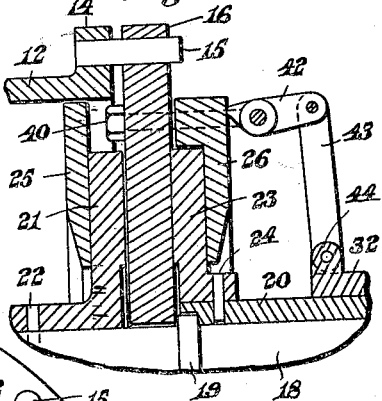
Figure 3 represents a partial section of same on line 3, 3, on Fig. 2.
Figure 2:
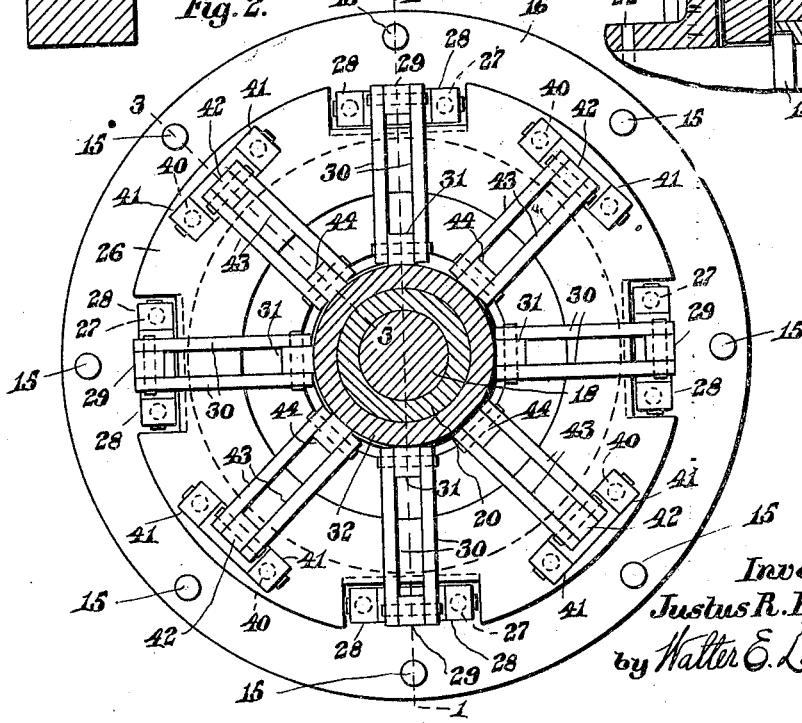
Figure 2 represents a transverse section of same on line 2, 2, on Fig. 1.

When the sleeve 32 is moved in the opposite direction into the position indicated in Fig. 3 of the drawings, the toes of the cam levers 42 will engage with the outer face of the ring 26 and through the studs 40 draw the disk 16 into firm frictional contact with the inner face of the flange 23.

When in this position there will be no rotary movement transmitted from the shaft 10 to the shaft 18 but a rotary movement will be imparted from said shaft 10 to the hollow shaft 20 surrounding the inner shaft 18.

It is obvious that by means of this construction of clutch all connection between the shaft 10 and the shafts 18 and 20 may be broken so that the latter shafts will remain at a standstill.

It is also selfevident that with a movement of the sleeve 32 in either direction, the two sets of toggle mechanism 29, 30 and 42, 43 will be actuated so that the disk 16 will be brought into frictional contact with one of the flanged members 21 or 23, while all frictional contact between said disk and the other flanged member will be broken.

If the hollow shaft 20 is connected with some sort of reversing gear, it is possible by means of this clutch mechanism to transmit rotary motion in one direction through the medium of the shaft 18 and to obtain a quick reversal of movement by the actuation of the clutch when the disk is moved from contact with the flange 21 into contact with the flange 23.

Having thus described my invention, I claim:

1. The combination of a rotatable friction disk having endwise movement; two revoluble members having flanges on opposite sides of said disk adapted to be frictionally engaged by said disk when moved endwise; a slidable sleeve; and two sets of toggle mechanisms actuated simultaneously by end movement of said sleeve, one set permitting said disk being disengaged from contact with one flange while the other set effects engagement between said disk and the other flange.

2. The combination of a rotatable friction disk having endwise movement; two revoluble members having flanges on opposite sides of said disk adapted to be frictionally engaged by said disk when moved endwise; rings contacting with the outer faces of said flanges; a slidable sleeve having peripheral ears; a set of studs extending through one ring and said disk having heads at one end bearing against said ring and having eyes at the opposite ends; cam members pivoted in said eyes with toes bearing against said disk; another set of studs extending through said disk and the other ring having heads at one end bearing against said disk and eyes at their opposite ends; cam levers pivoted in said eyes with toes bearing against the outer face of said other ring; and links connecting the outer ends of all of said cam levers with the ears of said sleeve.

3. The combination of a rotatable friction disk; two revoluble members having flanges on opposite sides of said disk adapted to be frictionally engaged by said disk, said disk and members having endwise movement relatively to each other; rings contacting with the outer faces of said flanges; a slidable sleeve having peripheral ears; a set of studs extending through one ring and said disk having heads at one end bearing against said ring and having eyes at the opposite ends; cam levers pivoted in said eyes with toes bearing against said disk; another set of studs extending through said disk and the other ring having heads at one end bearing against said disk and eyes at their opposite ends; cam levers pivoted in said eyes with toes bearing against the outer face of said other ring; and links connecting the outer ends of all of said cam levers with the ears of said sleeve.

4. The combination of a rotatable friction disk; two revoluble members having flanges on opposite sides of said disk adapted to be frictionally engaged by said disk, said disk and members having endwise movement relatively to each other and one of said members surrounding the periphery of the other; rings contacting with the outer faces of said flanges; a slidable sleeve having peripheral ears; a set of studs extending through one ring and said disk having heads at one end bearing against said ring and having eyes at the opposite ends; cam levers pivoted in said eyes with toes bearing against said disk;

another set of studs extending through said disk and the other ring having heads at one end bearing against said disk and eyes at their opposite ends; cam levers pivoted in said eyes with toes bearing against the outer face of said other ring; and links connecting the outer ends of all of said cam levers with the ears of said sleeve.

5. The combination of a rotatable friction member having endwise movement; a revoluble member having a peripheral flange, one face of which is adapted to frictionally engage said rotatable member; a ring adapted to contact with the opposite face of said rotatable member; studs extending through said ring and rotatable member having eyes at one end and heads at the other end; cam levers pivoted in said eyes with toes bearing against said rotatable member; a slidable sleeve having peripheral ears; and links connecting the outer ends of said levers and said ears.

6. The combination of a rotatable member provided with a plurality of pins parallel to its axis; a friction member having endwise movement on said pins; a revoluble member having a peripheral flange, one face of which is adapted to frictionally engage said rotatable member; a ring adapted to contact with the opposite face of said flange; studs extending through said ring and rotatable member having eyes at one end and heads at the other end; cam levers pivoted in said eyes with toes bearing against said rotatable member; a slidable sleeve having peripheral ears; and links connecting the outer ends of said levers and said ears.

7. The combination of a rotatable friction disk; two revoluble members having flanges adapted to contact with the opposite faces of said disk; two sets of toggle mechanisms adapted to operate simultaneously to force one flange into engagement with and at the same time force the other flange from engagement with said disk; and a slidable member for simultaneously actuating both toggle mechanisms.

Signed by me at 746 Old South Bldg., Boston, Mass., this 10th day of April, 1928.

JUSTUS R. KINNEY.